Nov. 12, 1968     M. H. DAVIS     3,410,156
DRIVE UNIT

Filed Oct. 24, 1966     4 Sheets-Sheet 1

INVENTOR.
MARION H. DAVIS

Nov. 12, 1968   M. H. DAVIS   3,410,156
DRIVE UNIT
Filed Oct. 24, 1966   4 Sheets-Sheet 2
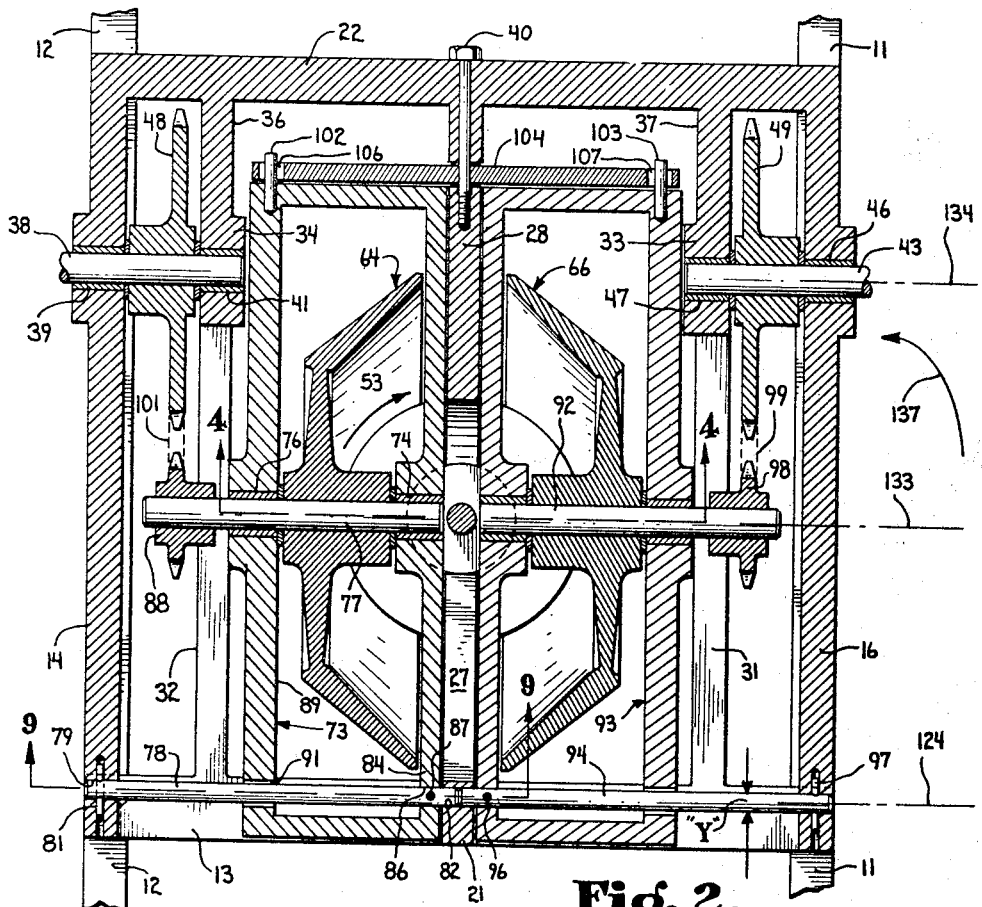
Fig. 2.
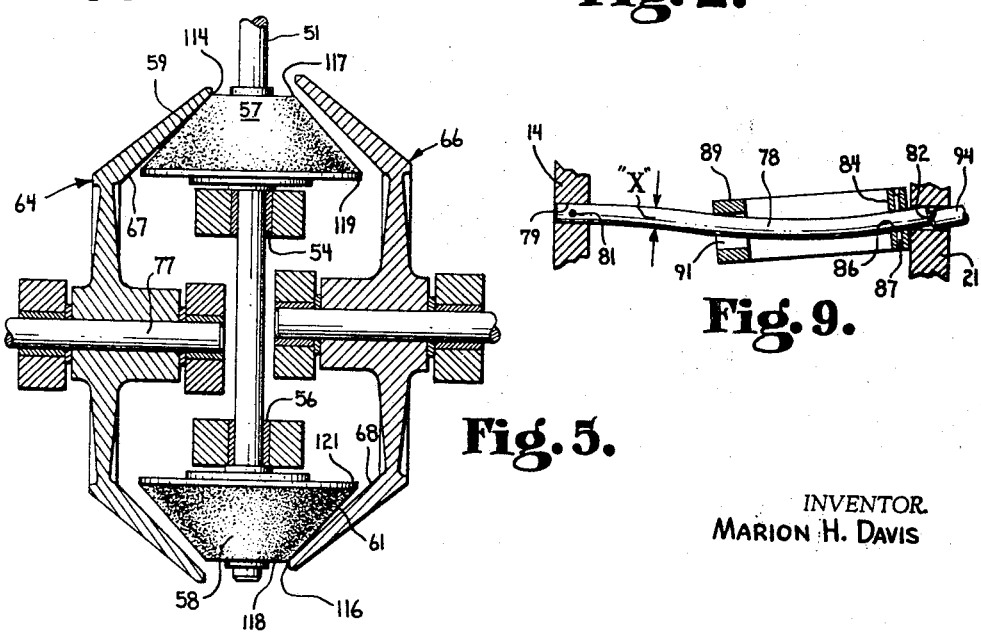
Fig. 5.
Fig. 9.
INVENTOR.
MARION H. DAVIS Nov. 12, 1968
M. H. DAVIS
3,410,156
DRIVE UNIT
Filed Oct. 24, 1966
4 Sheets-Sheet 3
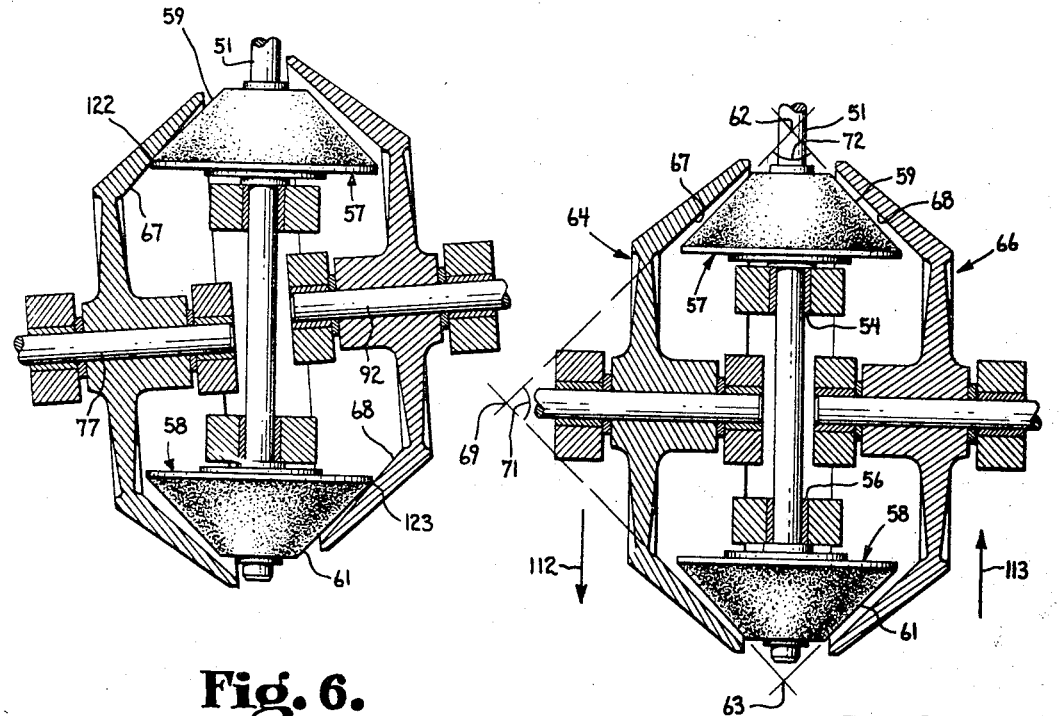
Fig. 6.
Fig. 4.
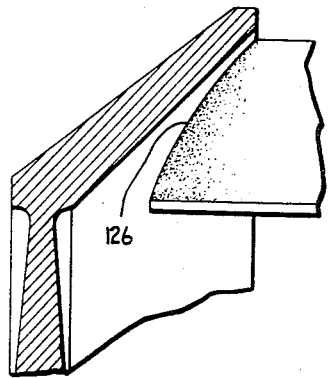
Fig. 7.
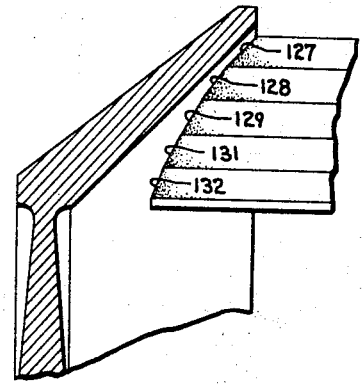
Fig. 8.
INVENTOR.
MARION H. DAVIS

INVENTOR
MARION H. DAVIS

United States Patent Office 3,410,156
Patented Nov. 12, 1968

3,410,156
DRIVE UNIT
Marion H. Davis, Hagerstown, Ind., assignor to V-Plex Clutch Corporation, Hagerstown, Ind., a corporation of Delaware
Continuation-in-part of application Ser. No. 371,699, June 1, 1964. This application Oct. 24, 1966, Ser. No. 589,117
5 Claims. (Cl. 74—721)

ABSTRACT OF THE DISCLOSURE

A pair of driver cones on a powered input shaft; and a pair of driven drums on separate output shafts mounted on frames rockable in a base frame for engagement of the drums with the cones for power transmission to the output shafts at speed ratios dependent on degree of rocking action. Resilient bars acting on the frames, and thereby urging the drums toward neutral position closely spaced from the cones.

---

This invention relates generally to vehicle power transmission and more particularly to a drive unit of simple construction incorporating the features of variable speed drive in forward and reverse directions, together with differential action.

This application is a continuation-in-part of my copending application Serial No. 371,699, filed June 1, 1964, and entitled Drive Unit, now Patent No. 3,306,132 issued Feb. 28, 1967.

There are many different types of vehicle power transmission devices known to those working in the art. For all types of vehicles, there is a continuous effort to obtain better drive units. This is true not only for large and powerful vehicles, but also for small vehicles of comparatively low power. In the latter type of vehicles which may include go-carts, golf carts, and garden tractors, for example, there is a constant need for simpler, more reliable, and better performing variable speed drive units.

It is, therefore, a general object of the present invention to provide an improved variable speed drive unit useful in vehicles and in other applications.

A further object is to provide a drive unit having a neutral condition regardless of the speed of the power source.

A further object is to provide a drive unit which can produce forward or reverse output operation regardless of input power source speed.

A further object is to provide a drive unit which can provide forward and reverse output operation on a single output shaft, if desired.

A still further object is to provide variable output shaft speeds with a constant input shaft speed.

A still further object is to be able to drive one output shaft in a forward direction and another output shaft in a reverse direction at the same time.

A still further object is to provide a drive unit useful with either a vertical or horizontal input shaft.

A further object is to provide a drive unit achieving the foregoing objects and which is quiet and durable in operation and easily operated.

Described briefly, a typical embodiment of the present invention includes a first frame to be secured to a vehicle, for example, and having a powered shaft mounted thereon for rotation. First and second conical driver members are secured to the powered shaft in spaced relationship to each other and with their conical surfaces facing away from each other.

Second and third frames are mounted to the first frame by torsion bars and each of these frames has a driven member mounted for rotation thereon. Each of the driven members has an internal conical surface in closely spaced facing relationship to portions of the conical friction surfaces of both of the driver members.

A control lever is provided for simultaneously engaging one of the driven members with one of the driver members and the other driven member with the other driver member so as to simultaneously provide outputs from both of the driven members at the same time and in the same direction. The lever is movable to both sides of a neutral condition to cause forward or reverse driving of the driven members, as desired. The mounting of the second and third frames to the first frame is such that the contact between the driven members and the driving members can be varied continuously to vary the ratio between the output and input speeds.

The full nature of the invention will be understood from the accompanying drawings and the following description and claims.

FIG. 2 is a horizontal section thereof taken along line 2—2 of FIG. 1 and viewed in the direction of the arrows.

FIG. 4 is a fragmentary section taken along the line 4—4 in FIG. 2 and viewed in the direction of the arrows, and showing the drive unit in neutral.

FIG. 5 is a view taken at the same place as FIG. 4 and showing the drive unit in a condition for low ratio of output speed to input speed.

FIG. 6 is a view taken at the same place as FIGS. 4 and 5 but showing the unit in a condition for high ratio of output speed to input speed.

FIG. 7 is an enlarged fragmentary view showing the preferred contour of the drive friction members.

FIG. 8 is an enlarged fragmentary view showing another possible configuration of the friction surface of the drive member.

FIG. 9 is a fragmentary section taken along line 9—9 in FIG. 2 and viewed in the direction of the arrows.

Figure 1:
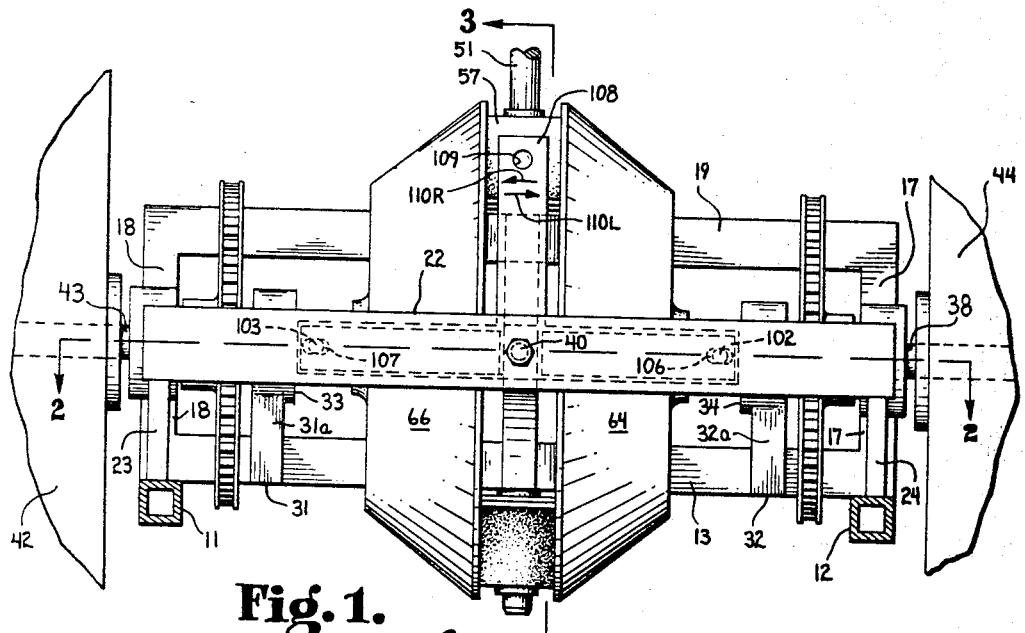
FIG. 1 is a front elevational view of the drive unit of the present invention as mounted to the frame of a vehicle such as a garden tractor, for example, with the tractor frame and wheels being shown fragmentarily.
Figure 3:
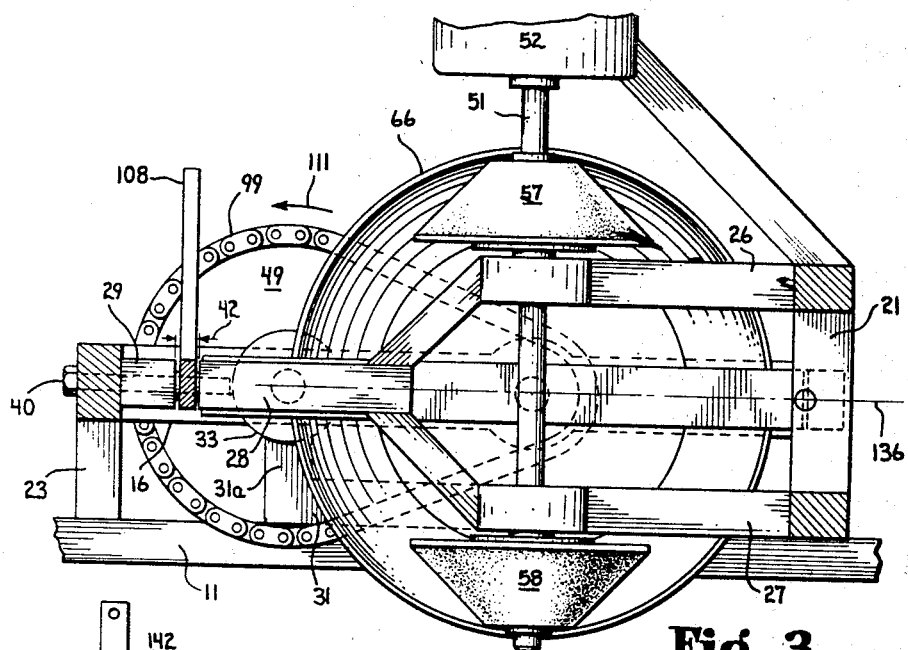
FIG. 3 is an elevation in section taken along the line 3—3 in FIG. 1 and viewed in the direction of the arrows.

Referring now to the drawings in detail, representing a typical embodiment of the present invention, a base frame is provided for mounting the unit to the vehicle frame, and in FIGS. 1, 2, and 3, the members 11 and 12 represent tractor frame side members. For convenience, the base frame is illustrated and described herein as a solid casting. However, it can be made of many types of materials, and by various means of fabrication of parts. The same is true of other frames and members to be described herein.

The illustrated base frame includes a lower rear cross member 13 secured to the top of the tractor frame side members by any suitable means such as bolts and nuts, for example. The base frame also includes side members 14 and 16 joining upstanding posts 17 and 18 which extend upwardly from the cross member 13 at the rear of the base frame. An upper rear cross member 19 of the base frame extends across the upper ends of the posts 17 and 18. An upstanding rear center post 21 extends between the lower and upper rear cross members 13 and 19, respectively, and is equidistant from the side members 14 and 16.

The base frame also includes a front cross member 22 extending between the front ends of the side members 14 and 16. Front support posts 23 and 24 may be connected between the front cross member and the tractor frame side members 11 and 12.

Upper and lower bearing support members 26 and 27, respectively, extend forwardly from the upper and lower rear cross members 19 and 13, respectively, and the front end portions thereof converge and join the member 28. A member 29 extending rearwardly from the front cross member 22 is aligned with the member 28 and a bolt 40 bridges the gap 42 between the ends of the members 28 and 29. All of the base frame members described to this point provide an integral rigid structural unit.

The base frame also includes a pair of intermediate lower side members 31 and 32 extending forwardly from the lower rear cross member 13 and upwardly at 31a and 32a, respectively. Enlargements 33 and 34 are provided at the upper ends of the upwardly extending portions 31a and 32a to accommodate axle inner support bearings. Members 36 and 37 extend forwardly from these bearing enlargements and are connected to the front cross member 22.

As shown in FIG. 2, an axle shaft 38 is supported in bearings 39 and 41 secured in the side member 14 and the enlargement 34, respectively. One of the tractor driving wheels 44 (FIG. 1) is secured to this shaft 38. The axle shaft 43 for the other tractor wheel 42 is received in the bearings 46 and 47 provided in the side members 16 and the enlargement 33, respectively. In order to drive shaft 38, a driven sprocket 48 is secured to the shaft 38 by any suitable means such as a key or set screw, for example. Similarly, a sprocket 49 is provided to drive the shaft 43.

A power input shaft 51 is supported for rotation in the base frame by upper and lower support bearings mounted in the upper and lower bearing support members 26 and 27. This input shaft may be directly connected to a suitable power source such as an engine 52 which may be secured directly to the base frame or to the tractor frame. The direction of rotation of the shaft is constant in the direction of the arrow 53 in FIG. 2.

The input shaft 51 is supported to prevent axial movement thereof with respect to the base frame. Therefore, it can only move in rotation in the upper and lower support bearings 54 and 56. First and second identical drive members 57 and 58, respectively, are secured to the input shaft 51 and, in the illustrated embodiment, the drive member 57 has a conical friction surface 59 thereon and the drive member 58 has a conical friction surface 61 thereon, these surfaces facing away from each other and in opposite directions. In other words, the conical surfaces are disposed so that the apex 62 of surface 59 and apex 63 of surface 61 are outboard of the drive members.

The members to be driven by these conical drivers are the first and second driven members 64 and 66, each of which in the illustrated embodiment has a conical inner surface facing the driver surfaces. For example, the drum 64 has the inner conical surface 67 facing a portion of each of the surfaces 59 and 61 of the drivers 57 and 58, respectively. Similarly, the drum 66 has the conical surface 68 facing portions of the surfaces 59 and 61. When the drive unit is in neutral condition, there is no contact between the surfaces of the drivers and the driven drums. However, they are in closely spaced relationship. It will be observed that the apex 69 of the surface 67 and the apex of the surface 68 are outboard of the drums.

The apex angle 71 of the surface 67 is approximately 2° less than the apex angle 72 of the surface 59. The same is true of surface 68. Therefore, there is an angle of convergence between the surfaces 67 and 68 and the surface 59 of approximately 1°. This is given by way of example only for a purpose which will become apparent as the description proceeds. Normally, the materials used for the surfaces 59 and 61 are durable composition friction materials of the general category which is used in dry disk clutches and brake linings. The materials ordinarily used in the drums 64 and 66 are cast iron. Other combinations of materials may be found equally suitable.

The arrangement of the driving and driven surfaces such that the surfaces are inboard of the apices thereof is one novel feature of the arrangement of the present invention. Another novel feature will be found in the means of supporting and moving the driven drums. For this purpose, and referring to drum 64 specifically, a frame 73 is provided with inboard and outboard bearings 74 and 76, respectively, which support the first output shaft 77, to which the drum 64 is secured. Frame 73 is supported in cantilever fashion by a torsion bar 78 as described below.

The outer end portion of the torsion bar 78 is received in an aperture 79 in the outer side member 14 of the base frame. It is pinned to the base frame by the pin 81 which prevents rotation of the bar outer end in the base frame. The inner end portion of the bar 78 is journaled in an aperture 82 in the center post 21 of the base frame. This end of the bar can, therefore, rotate to some extent, under torsional stress, with respect to the outer end of the bar, and, when so stressed, a restoring torsional force is created in the bar.

The frame 73 which carries the shaft 77 has an inner side member 84 with an aperture 86 therein which snugly receives the inner end portion of the bar 78. This frame member is pinned to the bar by the pin 87. Because of this arrangement, the weight of the frame 73 and the shaft 77 and the drum 64 as well as the drive sprocket 88 mounted to the outer end of the shaft 77 is supported in cantilever fashion by the torsion bar 78 and is so supported that there is equal clearance between the surface 67 of the drum 64 and the surfaces 59 and 61 of the driver disks. The outer side member 89 of the frame 73 has a large aperture 91 therein through which the torsion bar 78 passes with substantial clearance so that no support for the frame 73 is provided at this point.

For the drum 66 secured to the shaft 92, a frame 93 is provided and is pinned to the torsion bar 94 by the pin 96, the outer end of the torsion bar 94 being pinned to the base frame side member 16 by means of the pin 97. Torsion bar 94 thereby supports the driven member 66 in the same way and at the same spacing from the drivers as the torsion bar 78 supports the driven member 64.

Shaft 92 has a drive sprocket 98 at the outer end thereof which is connected by the chain 99 to the sprocket 49. The drive sprocket 88 at the end of shaft 77 is connected by the chain 101 to the sprocket 48.

At the front end of the frame 73, a pin 102 projects forwardly. Similarly, a pin 103 projects forwardly from the front end of the frame 93. A lever bar 104 is pivotally mounted to the bolt 40 and has an elongated slot 106 receiving the pin 102 and an elongated slot 107 receiving the pin 103. An upstanding arm 108 is connected to the lever 104 and has an aperture 109 therein for connection to a control linkage, if desired. By rocking the arm to either side of center as indicated by the arrows 110R and 110L, FIG. 1, the tractor can be made to go forward or reverse and at different speeds as described below. To drive the tractor forward, it is necessary for the sprocket 49 to be driven in the direction of the arrow 111 in FIG. 3. Sprocket 48 should also be driven in the same direction. It follows that the drums 64 and 66 must also be driven in the same direction. With the input shaft rotating clockwise as viewed from above in FIG. 2, forward rotation of the drum 64 can be obtained if the drum is moved down from the neutral condition shown in FIG. 4 in the direction of the arrow 112. For the drum 66 to be driven in the forward direction, it is necessary to move it from the neutral condition shown in FIG. 4 upwardly in the direction of the arrow 113. This movement will bring these drums into contact with the drivers as shown in FIG. 5. Because of the difference in the apex angles of the conical surfaces, contact is made between the surface 59 and surface 67 which is theoretically a point contact at 114. Similarly, point contact at 116 is obtained between the surface 61 and surface 68. To obtain the upward and downward shifting of the drums 66 and 64, required to obtain this contact, the arm 108 is pushed in the direction of the arrow 110L (FIG. 1) thereby pivoting bar 104 clockwise, as viewed in FIG. 1, displacing drum 66 upwardly and drum 64 downwardly.

Because, as will be evident from FIG. 5, the contact between the drivers and the driven members is at a minimum radius on the drivers and a maximum radius on the driven members, the drive unit is operating at a low ratio of output speed to input speed. This is the condition under which maximum torque can be transmitted to the wheels. Naturally, in actual operation, there is some flattening of the friction material at or about the theoretical point of contact and this provides the necessary area to accomplish torque transmission and yet the length of the contact area measured from the outer ends 117 and 118 of the driver surfaces toward the inner ends 119 and 121 of the driver surfaces is not sufficient to cause a detrimental scrubbing action between the driver surfaces and the driven surfaces. Therefore, no excessive heat generation occurs.

When an increase of output shaft speed is desired, it is necessary only to push the arm 108 harder to the left in the direction of the arrow 110L. This moves the drums to the position shown in FIG. 6. Under these circumstances, the contact points between the drivers and the drums have moved to the circle of maximum radius on the drivers and to a smaller radius on the driven drums. For example, the drive contact between the surface 59 and surface 67 now occurs at the point 122. Likewise, the drive point between the surfaces 61 and 68 occurs at the point 123. It is in this condition that the maximum ratio of output speed to input speed is obtained.

Precisely the same kind of action can be obtained for driving the tractor in reverse by merely pushing the arm 108 in the direction of the arrow 110R of FIG. 1. When the arm 108 is released, the drums return to the neutral condition shown in FIG. 4, wherein no torque is transferred between the drivers and the drums. It is the restoring forces created in the torsion bars as they are twisted by movement of the lever 104 that returns the frames and the drums therewith to the neutral condition when the external force is removed from the arm 108.

It is believed readily apparent how the upward and downward movement of the drums is obtained by pivoting the frames on the normal axis 124 (FIG. 2) of the torsion bars, this being done by moving the arm 108 to rock the lever 104. The frames 73 and 93 can actually be considered as rockable cradles supporting the driven drums and which are rocked on the axis 124 by rocking the lever 104.

However, it can be observed upon reference to FIG. 6 that in order to move the contact point from the minimum to the maximum circles of the driver surfaces, it is necessary not only to rock the cradles about an axis lying in a horizontal plane perpendicular to the input shaft axis and equidistant between the drivers, but it is also necessary to tilt the drum axes in a plane containing the input shaft axis. This is accommodated by having the aperture 91 in the frame 73 of ample size to allow considerable action of the frame 73 with respect to the torsion bar 78 at this point. This allows the torsion bar 78 to not only twist but also to bend in the configuration shown in exaggerated form in FIG. 9. This permits the axis of shaft 77 to tilt in the plane of the input shaft axis to a degree sufficient to permit the movement of the contact point. The amount of this tilting is exaggerated in FIGS. 6 and 9 to illustrate the action. The torsion bar 78 can be shaped to provide practically any desired amount of bending in a plane parallel to the output shaft axes and the input shaft axes and yet minimize bending in a plane perpendicular thereto. In other words, by minimizing the dimension X (FIG. 9) throughout a portion of the length of the torsion bar 78, and maximizing the dimension Y (FIG. 2), the desired amount of bending in a vertical plane can be obtained consistent with elimination of bending in a horizontal plane and yet obtain the torsional restoration force required to keep the driven drums in neutral at all times that there is no application of external force to the arm 108. The torsion bars will maintain the neutral condition even though the tractor may be coasting over rough terrain in neutral. Because the frames 73 and 93 are pinned to the lever 104, these frames are prevented from accidentally moving in the same direction such as might otherwise occur if the tractor backed off a curb. If they did move in the same direction and both drums simultaneously engaged one of the drivers, for example, the right wheel would be driven in one direction and the left wheel in the other direction. It would be undesirable to have this occur as the result of a vertical jolt on the tractor, and the illustrated construction prevents such an event. It will be recognized, however, that if it were desired to use the drive unit of the present invention in an application where one wheel is rotated in one direction and the other is rotated in the other direction, means could readily be incorporated for simultaneously moving both of the cradles in the same direction to obtain that result, as described hereinafter.

Referring now to FIGS. 7 and 8, there is shown in FIG. 7 a convex drive surface 126 on the driver which is actually preferable to the straight conical surface shown for simplicity in the preceding illustrations. By having a surface of this nature which is generally convergent toward an apex on the shaft axis outboard of the drive members, the theoretical point contact can be obtained at any point along the surface depending on the amount of force applied to the lever arm 108 to thereby obtain an infinite variation of speed ratios from the maximum to the minimum without any detrimental scrubbing action.

FIG. 8 represents another possible configuration of the outer surface of the drive member wherein it is composed of a plurality of conical segments 127, 128, 129, 131, and 132. This may be found desirable to give a more incremental and stepped-type speed ratio change from minimum to maximum. Other configurations of the driver surface and possibly also the driven drum surface may be found useful.

The present invention also provides a differential action useful to permit a speed difference between the inner and outer wheels as the vehicle is moving in a circular fashion. Normally, when the drive unit is in neutral, the rotational axes 124, 133, and 134 of the torsion bars, output shafts, axles, respectively, are in a common horizontal plane 136 (FIG. 3). When the drive unit clutching surfaces 59, 67, 61, and 68 are engaged for driving the vehicle forward, the axis of the shaft 92 has moved up out of the plane 136 and that of the shaft 77 has moved down out of the plane 136. This was, of course necessary, to obtain the driving engagement. Normally, this will increase the tension in both of the chains to some extent, because the output shaft axes are pivoting with respect to the torsion bar axis, which is on the side of the output shaft axes opposite to the side on which the axles are located. Assuming now that the tractor is turning to the left which is in the direction indicated by the arrow 137 in FIG. 2, the left wheel speed should decrease with respect to the right wheel speed. This means that the amount of tension in the chain 101 connected to the left wheel shaft will increase compared to the tension in the chain 99 driving the right wheel axle. Because of the normal location of the three axes in the plane 136, the normal tendency of the tension in the drive chains is to return the driven drums to neutral. During the left-hand turn, the pull on the left wheel driving chain will be greater than that on the right wheel driving chain because of the natural tendency of the left wheel to resist turning as fast as the right wheel as the tractor makes a left-hand turn. Because the tension in the left-hand chain will be greater than the right, the chain force tending to restore the axle 77 to the neutral plane 136 will be greater than that for the right output shaft 92. Consequently, the power transmission to the left-hand drum can be less than that to the right-hand drum, the output speed of the left drum will be less than that of the right, and a natural differential action will be obtained.

Another advantage to be noted is the fact that, although the present invention provides this differential action, the amount of slip can be controlled and limited by the force applied to the control lever arm 108.

It is believed that from the foregoing description it will be apparent that the unusual mechanism of the present invention provides a very excellent drive unit particularly for vehicles such as garden tractors, golf carts, for example, and that it is especially well adapted and able to achieve the objects set out herein as well as providing advantages and features which may not have been specifically mentioned herein.

In the event that power transmission from the output shafts to the axles is to be by gear drive using gears with external teeth, rather than by chain and sprocket on external and internal gears, the axle axis would be located between the torsion bar axis and the output shaft axis, to obtain the differential action.

As suggested previously herein, there may be vehicular or non-vehicular applications of the present invention where it is desirable to drive one output shaft in one direction and the other output shaft in the opposite direction. To do this, both cradles must be rocked up or down at the same time, the direction depending on which output shaft is to go forward.

Figure 10:
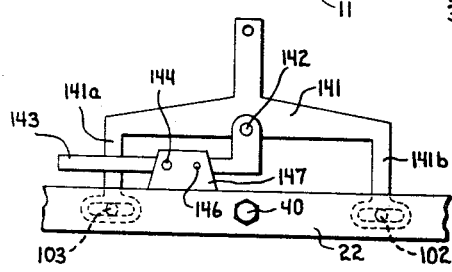
FIG. 10 is a fragmentary front elevational view of an embodiment showing means for obtaining simultaneous operation of two output shafts in opposite directions.

For accomplishing this, the modification shown in FIG. 10 represents one means. Instead of a straight lever 104 pivoting on bolt 40, a lever 141 is substituted, it having downturned legs 141a and 141b with slots therein receiving pins 103 and 102 respectively. A vertically movable pivot for level 141 is provided on pin 142 mounted in an upstanding yoke at the inner end of shift lever 143. Lever 143 is pivotally mounted on pin 144 fixed to the base frame to move pin 142 up or down, as desired. If desired, means can be employed to lock lever 143 in neutral. One way to do this would be by a lock pin 146 through the base frame mount 147 and through lever 143. Many alternate means for doing this and for moving the cradle frames may also be devised.

Figure 11:
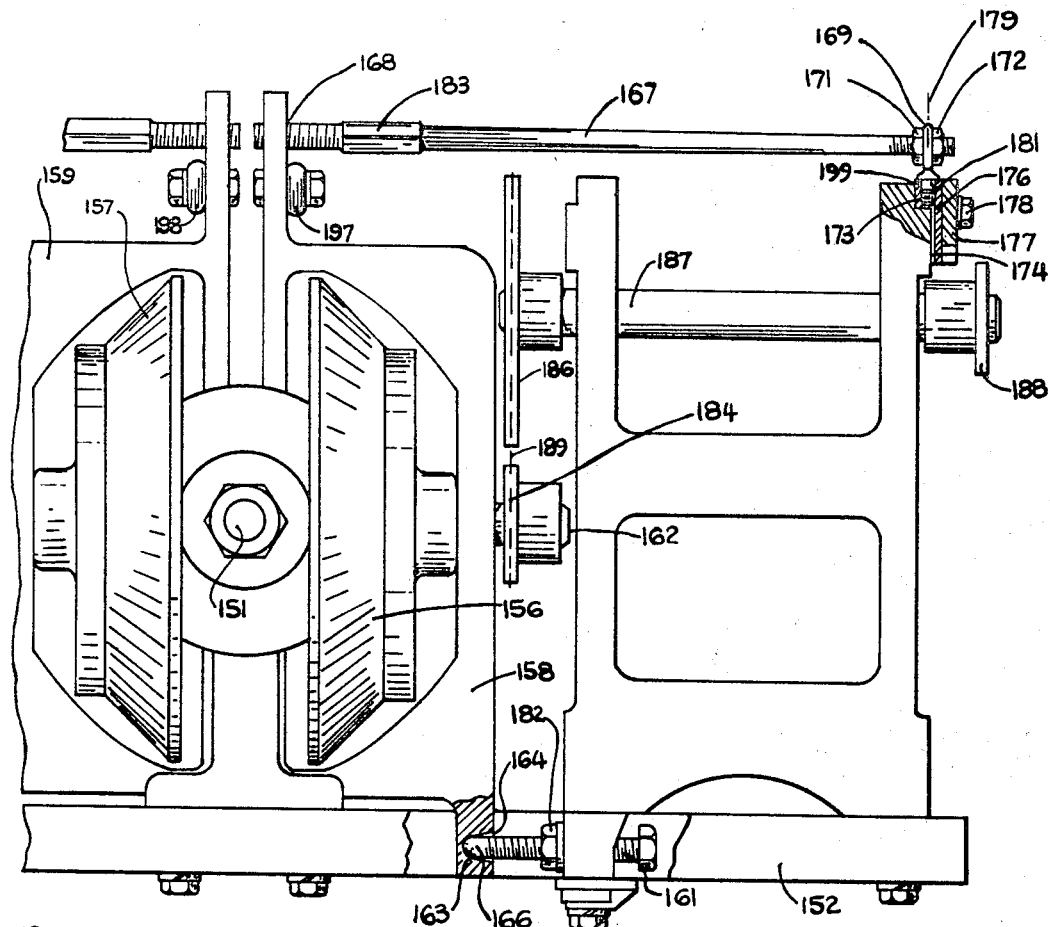
FIG. 11 is an elevational view of another embodiment of the present invention with a portion broken away to conserve space in the drawing, this embodiment employing slightly different mounting means.
Figure 12:
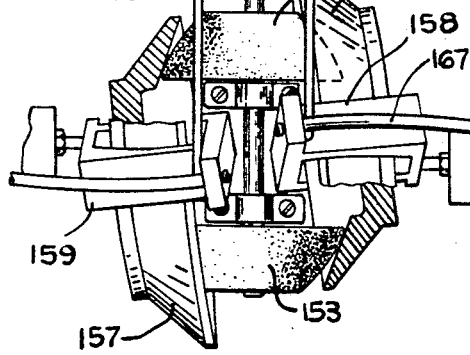
FIG. 12 is a top plan view of the embodiment of FIGURE 11 on a much smaller scale showing in an exaggerated fashion the action of the components producing an output.

In the variations shown in FIGURES 11 and 12, a horizontal input shaft 151 is mounted to frame 152 and has the drive members 153 and 154 secured thereto. The output members 156 and 157 are supported on shafts mounted in the frames 158 and 159 movably mounted to the frame 152 in a manner which will be described.

Because the frame 159 and output member 157 are mounted and arranged in the same manner as frame 158 and output member 156, a description of the latter will suffice for both. The frames 158 and 159 are mounted so that they are normally disposed with the output members thereof in closely spaced relationship to the drive members 153 and 154 as in FIG. 4. A bolt 161 is threadedly received in the frame 152 and is coplanar with and directly below the shaft 162 when the drive unit is in neutral. The bolt has a rounded inner end at 163 received in a rounded socket 164 in the frame 158 and provides pivotal support of the frame 158 at a point 166.

A torsion bar 167 has one end threadedly received in the frame 158 at 168 and the other end thereof passes through an eyelet 169 and is threadedly secured thereto by the jamb nuts 171 and 172 on opposite sides of the eyelet. The eyelet is actually the upper end of a member having a cylindrical stem 173 received in a cylindrical aperture 174 in a block 176 clamped to the frame 152 by a plate 177 secured thereto by bolts 178. The stem is rotatable in the block 176 on an axis 179. It is retained in the block by a retainer ring 181. Thus the horizontal position of the driven member 156 with respect to the drive members 153 and 154 can be adjusted by turning the bolt 161 and fixing it in the desired position by the jamb nut 182, and by turning the torsion bar 167, which is facilitated by provision of the hexagonal tool receiving surface 183 thereon.

A sprocket 184 mounted to the output shaft 162 is connected by chain to the sprocket 186 connected to the shaft 187 which may have a sprocket 188 at the outer end thereof for driving a vehicle road wheel. The fit of the chain 189 on the sprockets 186 and 184 can be such as to accommodate relatively small linear movement of shaft 162 with respect to the frame 152 while the shaft 187 remains in a constant position with respect to the frame 152 although, of course, it is freely rotatable in the frame.

When the control rod 192 is moved in the direction of the arrow 193 a small extent, contact of the output members with the input members is attained in much the same manner as shown in FIG. 5. Upon further movement of the control rod in the direction of the arrow 193, the pivoting of the lever 194 on the axis 196 fixed in the frame 152 moves the output drive members along the input drive member surfaces in a manner similar to that described above with reference to FIGS. 4 through 6, and as shown in FIG. 12. Upon initial movement and before contact of the output member 156 with the input member 153, the link 197 connected to lever 194 tilts the frame 158 on a line between the point 166 and a point 199 on the axis 179 of the torsion bar outer mounting. This initially imparts a restoring force in the torsion bar because the rotational axis of the torsion bar pivot 179 is not colinear with a line drawn between the pivot point 166 and any point on the torsion bar pivot axis. Further movement of the control rod pulling the link 197, by making contact between the input drive member 153 and the output drive member 156 at various points along the surfaces of both (providing the various speed ratios) causes a further tilting of the frame 158 as indicated in FIG. 12 in exaggerated sense, imparting a bow to the torsion bar as shown whereupon the further restoring force stored therein tends to move the apparatus back to neutral once the control force is removed from the control rod 192.

Figure 13:
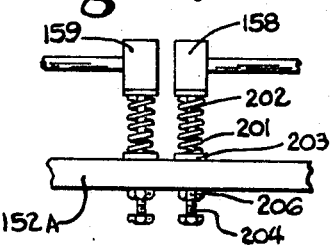
FIG. 13 is a fragmentary rear end elevational view of the embodiment of FIGURE 12 but oriented for mounting with a vertical input shaft rather than horizontal input shaft, illustrating the centering spring arrangement.

Referring now to FIGURE 13, it is well to keep in mind that when the shaft 151 of the apparatus is horizontal, the support frames are normally upstanding and tend to be self centering. However with the input shaft vertical as might be desirable in some installations, the whole apparatus will be tipped 90° so that the mounting frames may tend to pivot downwardly with respect to the pivotal mounting bolts thereon. A variety of means may be employed to avoid this and one example is shown in FIGURE 13. In this example, the support frame 158 has a coil spring 201 disposed under it and resting on that flat upper surface of a base frame extension 152A which is affixed to the base frame shown in FIGURES 11 and 12. This spring is directly mounted under the torsion bar and is guided on a guide pin 202 threadedly received in the support frame 158 under the torsion bar. The lower end of the spring is actually seated in a cup 203 disposed at the upper end of an adjustment screw 204 threadedly received in the frame extension 152A. By turning the bolt 204 in or out, the cup 203 can be raised or lowered, respectively to locate the frame 158 so that the drive member 156 is centered with respect to the drive members 153 and 154. The jamb nut 206 can then be tightened in place to lock the bolt, thus centering the support frame. The same procedure can be followed for centering the frame 159.

From the foregoing, it is apparent that variations may be made within the scope of the present invention and which would not have the same construction as that shown and described herein. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A drive unit comprising:
a base frame;
a first shaft mounted for rotation in said base frame;
a first drive member mounted on said first shaft and having an external drive transmitting surface thereon, said surface being generally convergent toward a point on the first shaft axis;
a first support frame supporting a second shaft;
a second drive member secured to said second shaft and having an inner drive transmitting surface thereon facing said external drive transmitting surface, the drive transmitting surfaces of said first and second drive members being normally held in closely spaced relationship to each other to avoid power transmission between said first shaft and said second shaft and thus provide a neutral condition while enabling transition to a power transmission condition;
said drive transmitting surfaces being circular and centered on their respective shaft axes;
and said drive members disposed with a surface portion of a certain radius on said external surface closely spaced to a surface portion of a particular radius on said inner surface, and with a surface portion on said external surface of greater radius than said certain radius being closely spaced to a surface portion on said inner surface of lesser radius than said particular radius;
and control means movable to initially engage portions of said drive transmitting surfaces providing power transmission between said drive members at a first speed ratio, said control means being movable further to effect power transmission between said drive members at a speed ratio different from said first speed ratio;
said first support frame being mounted through a universal pivot to said base frame at one point and through a swivel to said base frame at a second point spaced from said first point, said points and said second shaft being disposed in a common plane when the unit is in said neutral condition, said second drive member being between said first shaft and a line connecting said points, whereby said support frame with said second drive member thereon is swingable about said line by said control means.

2. The combination of claim 1 and further comprising:
a resilient bar connected to said base frame and to said support frame for urging said drive members toward said normally held closely spaced relationship;
centering means mounted on said base frame and supporting said support frame at a location remote from said universal pivot, said centering means including a spring supporting as much of the weight of said support frame and second drive member as needed to avoid transmission of said weight to said resilient bar.

3. The combination of claim 1 and further comprising:
a first pivot member mounted to said base frame and having a rounded end received in a socket in said first support frame and providing said universal pivot, said first pivot member being adjustable on said base frame to change said spaced relationship in said neutral condition;
a second pivot member mounted to said base frame and rotatable therein on a fixed axis and providing said swivel;
and a resilient bar having a first portion affixed to said support frame at a location remote from said pivot member and said bar having a second portion affixed to said swivel with an elongated portion between said first and second pivot members whereby restoring forces are generated in said bar upon swinging said support frame about said line.

4. The combination of claim 3 wherein:
said bar is threadedly received at said support frame and at said second pivot and is adjustable to change the distance between said support frame and said second pivot and thereby change the length of elongated portion therebetween.

5. The combination of claim 4 wherein said control means is a shaft connected to said support frame at a location remote from said universal pivot.

References Cited

UNITED STATES PATENTS

| | | | |
|---|---|---|---|
| 1,170,877 | 2/1916 | Colwell et al. | 74—721 |
| 1,197,535 | 9/1916 | O'Donnell | 74—191 |
| 1,241,609 | 10/1917 | Davis | 74—721 X |
| 1,633,316 | 6/1927 | Davis | 74—191 |
| 1,852,360 | 4/1932 | Mitchell | 74—721 |

ARTHUR T. McKEON, *Primary Examiner.*